United States Patent [19]

Tokuoka

[11] 4,347,291

[45] * Aug. 31, 1982

[54] MAGNETIC RECORDING MEDIUM AND PREPARATION THEREOF

[75] Inventor: Yasumichi Tokuoka, Tokyo, Japan

[73] Assignee: TDK Electronics Co., Ltd., Tokyo, Japan

[ * ] Notice: The portion of the term of this patent subsequent to Jan. 5, 1999, has been disclaimed.

[21] Appl. No.: 208,687

[22] Filed: Nov. 20, 1980

[30] Foreign Application Priority Data

Nov. 28, 1979 [JP] Japan .................. 54/152914

[51] Int. Cl.³ .............................. G11B 5/62
[52] U.S. Cl. ........................... 428/694; 75/0.5 AA; 148/31.5; 148/31.55; 148/105; 252/62.55; 252/62.59; 427/132; 428/900
[58] Field of Search ................. 427/127, 132, 219; 75/0.5 AA; 148/105, 31.5, 31.55; 252/62.55, 62.59; 423/632, 633; 428/694, 692, 900

[56] References Cited

U.S. PATENT DOCUMENTS

| | | | |
|---|---|---|---|
| 3,947,502 | 3/1976 | Leitner et al. | 252/62.59 X |
| 4,043,846 | 8/1977 | Amemiya et al. | 252/62.55 X |
| 4,133,677 | 1/1979 | Matsui et al. | 423/633 X |
| 4,169,912 | 10/1979 | Schonafinger et al. | 427/219 X |
| 4,178,171 | 12/1979 | Steck et al. | 148/105 X |
| 4,256,484 | 3/1981 | Rodrian | 148/105 X |

FOREIGN PATENT DOCUMENTS 7600190  7/1976  Netherlands ................ 252/62.59

*Primary Examiner*—Jack Cooper
*Attorney, Agent, or Firm*—Oblon, Fisher, Spivak, McClelland & Maier

[57] ABSTRACT

A magnetic recording medium is produced by forming an alkaline aqueous slurry of an acicular hydrated iron oxide or an acicular iron oxide as a starting material; adding a water soluble silicate to said slurry; treating it by a hydrothermal reaction in a closed reactor as an autoclave at elevated temperature and pressure; dehydrating and drying said slurry to obtain a dry iron oxide containing $SiO_2$ component; converting it into a magnetic metallic iron powder by a reduction in a reducing atmosphere as hydrogen atmosphere; and coating a magnetic composition obtained by mixing said magnetic metallic iron powder with a binder.

A magnetic recording tape comprises metallic iron powder having a coercive force of 1000 Oe or more and a residual magnetic flux density of 2000 gauss or more and an orientation degree as a ratio of squareness ratio in longitudinal direction to squareness ratio in transversal direction:

$$\text{Orientation degree} \geq 4.90 \times \frac{\text{squareness ratio}}{\text{in longitudinal direction}} - 1.87$$

2 Claims, 3 Drawing Figures

MAGNETIC RECORDING MEDIUM AND PREPARATION THEREOF

BACKGROUND OF THE INVENTION

1. Field of the Invention

The present invention relates to a magnetic recording medium comprising a magnetic metallic iron particles. More particularly, it relates to a magnetic recording tape having excellent orientation.

2. Description of the Prior Arts

It is well known that the important characteristics of magnetic particles for magnetic recording include a coercive force of magnetic particles, a dispersibility of magnetic particles in a magnetic paint for coating and an orientation of magnetic particles in a magnetic recording tape. As it is well known, these characteristics are important factors which highly affect to the characteristics of the magnetic recording tape. The shape of the magnetic particle directly relates to these characteristics of the magnetic particles. For example, when the coercive force is given by the shape anisotropy as the conventional magnetic recording medium, the coercive force is increased depending upon the improvement of the acicular property of the particles. The dispersibility is improved by decreasing branched or curved particles whereby the steric hindrance is decreased to improve the orientation and accordingly, the recording characteristics of the magnetic recording tape are improved. Therefore, it is important to obtain a magnetic particle having excellent acicular property with smaller branched configuration in the preparation of the magnetic particles for a magnetic recording medium. in the industrial process, hydrated ferric oxide which is mainly goethite $\alpha$-FeOOH and easily forms an acicular particle is firstly produced as a starting material and is converted into a magnetic metallic iron particle by heating, dehydrating and reducing it. These process have been usually employed.

In this process, the acicular property of the resulting particles depends on the shape of the starting goethite and accordingly, the shape of the goethite particles should be controlled. But in the conventional type of the particles, the deformation and sintering of the particles are disadvantageously easy to occur by the dehydration and the migration of atoms in the reduction process. This causes the limitation of the orientation in the tape as described below.

The present invention is to overcome the disadvantages and to succeed in the invention of the magnetic recording tape which is different from the conventional one.

SUMMARY OF THE INVENTION

It is an object of the present invention to provide a magnetic recording medium which has high coercive force, high residual magnetic flux density and high orientation degree.

The foregoing and other objects of the present invention have been attained by providing a magnetic recording tape having a coercive force of 1000 Oe or more and a residual magnetic flux density of 2000 gauss or more and an orientation degree of 4.90 $\times$ (squareness ratio in longitudinal direction) $-$ 1.87 or more. An orientation degree is a ratio of the squareness ratio in the longitudinal direction, that is, parallel to particle alignment to the squareness ratio perpendicular to particle alignment.

DETAILED DESCRIPTION OF THE PREFERRED EMBODIMENTS

The orientation of the magnetic recording tape means the orientation of acicular particles in the longitudinal direction of the tape. In the case of the acicular magnetic iron particles, the magnetic anisotropy is in the direction of acicular major axis of the particle Therefore, with the increase of the orientation of the magnetic particles in the tape, the residual magnetic flux density in the longitudinal direction of the tape approaches to the saturated magnetic flux density and the residual magnetic flux density in the transversal direction approaches to zero. Consequently, the ratio of the residual magnetic flux density (Br) to the saturated magnetic flux density (Bm), that is, a squareness ratio in the longitudinal direction (Br/Bm)$\parallel$, approaches to 1 depending upon the increase of the orientation. On the other hand, the ratio of the squareness ratio (Br/Bm)$\parallel$ in the longitudinal direction to the squareness ratio (Br/Bm)$\perp$ in the transversal direction ((Br/Bm)$\parallel$/(Br/Bm)$\perp$: this is referred to as orientation degree) is increased infinitive depending upon the increase of the orientation.

Figure 1:
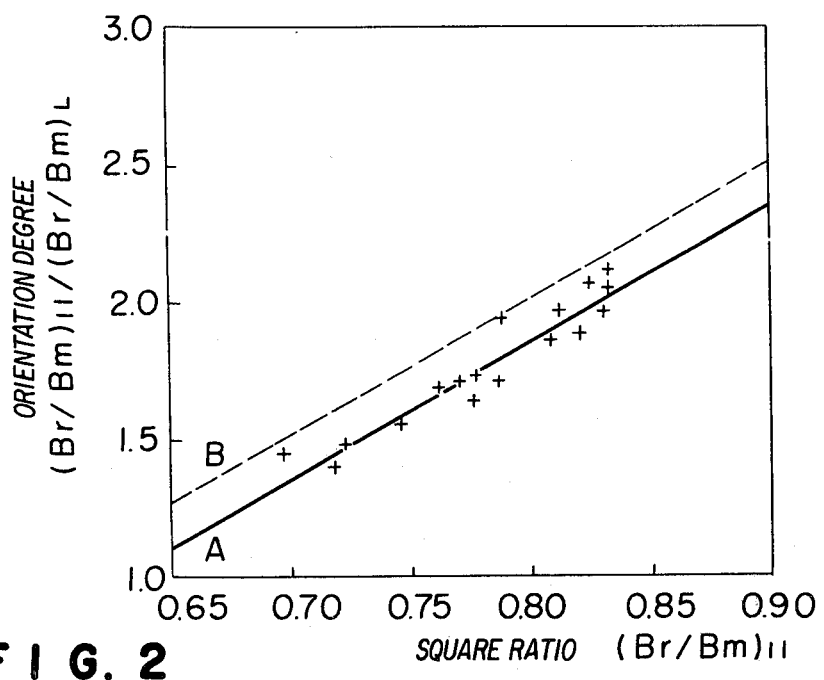
FIG. 1 is a graph showing relations of squareness ratios in the longitudinal direction and orientation degrees of the conventional magnetic recording tapes.

The orientation in the longitudinal direction can be determined by the squareness ratio (Br/BM)$\parallel$ in the longitudinal direction (hereinafter referring to as squareness ratio) and the increase of the magnetic component in the transversal direction of the tape caused by branching of acicular particles etc. can be determined by the orientation degree. As shown in FIG. 1, the relations of the orientation degree and the squareness ratio are substantially constant. The fact is confirmed by the experiments.

In FIG. 1, the characteristics of magnetic recording tapes prepared by using the conventional magnetic metallic particles in the specific condition and the characteristics of the commercially available magnetic recording tapes (trade name: 3M: Metafine; Sony: Metallic; Fuji: Super range; Maxell: MX; BASF: Metal IX) are plotted.

As it is found in FIG. 1, the relation of the orientation degree and the squareness ratio is substantially linear relation. The orientation degree of the magnetic recording tape (metallic tape) using the magnetic metallic particles is approximately in the relation of $$\text{Orientation degree} = 4.90 \times \text{(squareness ratio)} - 2.07$$

(correlation coefficient R = 0.949)

Since, the orientation of the magnetic recording tape is varied depending upon not only the shape of the magnetic particle but also the conditions of the post-treatment such as the dispersing method, preparing the magnetic paint, passing the coated tape in the magnetic field applied for orientation, even though the same magnetic particles are used, the squareness ratio and the orientation degree of the magnetic recording tape are varied. Therefore, even though the squareness ratio and the orientation degree are separately defined, the inherent characteristics of the tape cannot be defined. However, if both values are combined, the squareness ratio and the corresponding orientation degree are substantially defined in the conventional metallic tape as shown in FIG. 1. It is considered from this figure that these tapes and the magnetic particles used have the common factors, which may be the deformation, branch or curve of acicular particles and the sintering of particles. These factors cause the increase of the multi-axial particles among the uniaxial particles and remain without change against any different dispersing method or any preparation of the magnetic paint to provide the relation shown in FIG. 1. Namely, the multi-axial particles cause to increase the magnetization in the transversal direction at a constant ratio to the orientation of the particles in the longitudinal direction. Therefore, the relation of the squareness ratio and the orientation degree is substantially the same as shown in FIG. 1, even though the preparation of the magnetic tapes are different. This fact means that the orientation degree has a critical value at a given squareness ratio even though the condition for preparating the magnetic recording tape is varied in any condition in the post-treatment. The straight line (B) can be established as the critical line of the orientation degree as described in the magnetic recording tapes prepared by the known magnetic particles and the commercially available magnetic recording tapes.

In accordance with the present invention, the acicular hydrated iron oxide or acicular iron oxide is used as the starting material to prepare an alkaline aqueous slurry and a water soluble silicate is added to the slurry and the hydrothermal reaction is carried out in a closed reactor as an autoclave at a desired temperature under high pressure. Then the precipitate is washed with water and filtered and dried to produce an iron oxide containing $SiO_2$ and the product is reduced to obtain an acicular metallic iron particles. The feature of the present invention is to dope silicon component into the hydrated iron oxide or the iron obtained by dehydrating it in the closed reactor under high pressure at high temperature for producing the iron oxide containing $SiO_2$. Thus, it is possible to obtain a magnetic recording medium having superior characteristics to those of the product obtained by using the conventional magnetic metallic particles obtained by reducing the conventional iron oxide.

In the process, pH of the slurry of the iron oxide or the hydrated iron oxide as the starting material is in a range of 8 to 14. The silicate is incorporated at a molar ratio of 0.1 to 10% as $SiO_2$ to Fe. The temperature of the hydrothermal reaction is preferably in a range of 100° to 250° C.

As described in the following examples, in detail, the characteristics of the magnetic recording medium prepared by using the acicular metallic iron particles according to the present invention are further superior to the level of the conventional magnetic recording media as described above.

Figure 2:
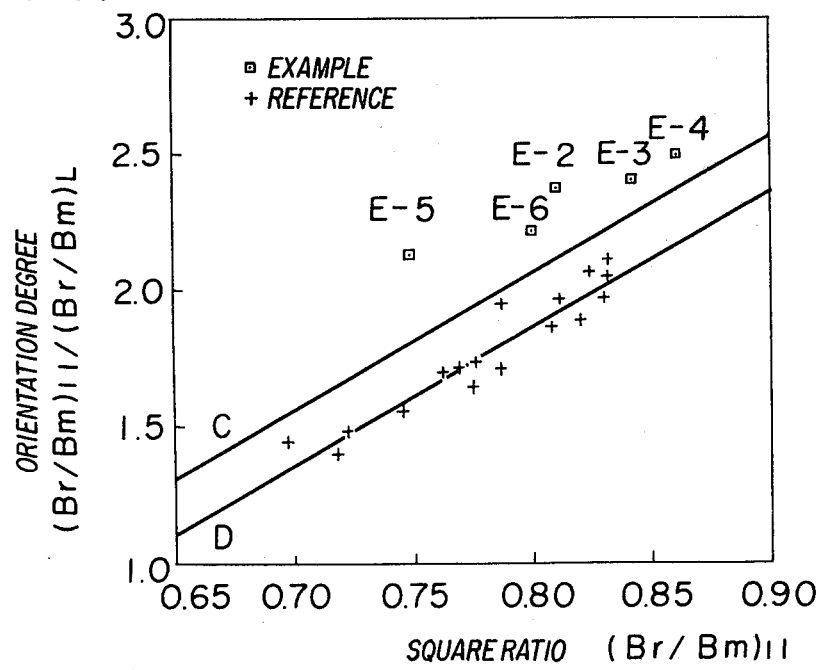
FIG. 2 is a graph showing relations of squareness ratios and orientation degrees of the conventional magnetic recording tapes as shown in FIG. 1 and the magnetic recording tapes of the present invention.

In FIG. 2, the characteristics of the magnetic recording tape of the present invention are plotted together with the data of FIG. 1 to compare the data with those of FIG. 1. As it is found in the drawings, the orientation degree is remarkably improved even though the squareness ratio is the same. As shown in Table 3 and in the following measurement, the orientation degree is higher for 0.2 or more, that is, orientation degree $\geq 4.90 \times$ (squareness ratio) $- 1.87$. This higher orientation degree is thought to be due to the substantial improvement in the deformation, in branch or curve and in the sintering of the acicular particles. It is clear that the magnetic recording tape of the present invention is substantially different from the conventional ones in view of the magnetic uniaxial property of the particles.

In the drawings, the straight line (C) means the lower critical line of the orientation degree of the magnetic recording tape of the present invention. The orientation degrees of the present invention are above the line (C), that is; orientation degree $\geq 4.90 \times$ (squareness ratio) $- 1.87$.

On the other hand, the orientation degrees of the conventional magnetic recording tapes and the commercially available tapes shown in FIG. 1 are lower than the line (C).

The difference of the present invention from the conventional technology will be illustrated in detail.

The process for producing α-FeOOH by oxidizing a precipitate of ferrous hydroxide in an alkaline, neutral or acidic aqueous solution and the process for heat-treating a precipitate of ferric hydroxide in an alkaline aqueous solution in an autoclave under high pressure is known. Especially the former is widely adoped as the industrial process. The magnetic metallic iron particles are obtained by dehydrating and reducing the resulting hydrated iron oxide in a hydrogen atmosphere. In this reduction step, fine iron crystalites form and then grow in the goethite particles. If the growth of the iron crystals is severe, the deformation and the sintering of the particles are caused to adversely affect to the orientation. Therefore, as the technology for preventing the deformation and sintering of the particles, many processes for adding or adsorbing Si, B, Ti or the other second or third element to the particles of the starting material are proposed. In accordance with the processes of the examples of Japanese Examined Patent Publication No. 19541/1977 and No. 30114/1978; Japanese Unexamined Patent Publication No. 82395/1973; No. 72354/1977; No. 121799/1977; No. 134858/1977 and No. 10100/1978 as the typical examples, magnetic particles are respectively produced and used for the preparation of the magnetic tapes. They are used as References together with the commercially available magnetic recording tapes. They may represent all of the conventional technology.

The differences of the present invention from the conventional technology include firstly, to use the goethite having remarkably improved acicular property is used as the starting material; and secondly, to have the double layer structure of the goethite which has the goethite layer containing uniformly Si component as the outer layer so as to remarkably contribute for preventing deformation of the particles; thirdly to carry out the hydrothermal reaction of the goethite under high pressure so as to obtain such goethite, thereby succeeding to prepare the magnetic recording tape having high orientation which could not be obtained by the conventional treatment for preventing the deformation and the sintering.

The present invention will be illustrated by certain examples and references which are provided for purposes of illustration only and are not intended to be limiting the invention.

EXAMPLE 1

Into 1 liter of a solution of 3 mol of $FeCl_3$, 4.5 liter of an aqueous solution of 12.2 mol of NaOH was added dropwise at a rate of 50 cc per minute. The resulting precipitate of ferric hydroxide was kept at room temperature for 24 hours for ageing. After 24 hours, the slurry and together with a mother liquor were charged into an autoclave and a hydrothermal reaction was carried out at 200° C. for 2 hours under high pressure condition. The resulting slurry was referred to as Slurry I.

EXAMPLE 2

Into Slurry I obtained in Example 1, 5.4 g. of a solution of sodium silicate having a concentration of 20% as $SiO_2$ was added with stirring and the precipitate together with the mother liquor was charged into an autoclave and a hydrothermal reaction was carried out at 200° C. for 1 hour. Then, the precipitate was washed, filtered, dried and ground and the product was reduced in hydrogen gas flow in an electric oven at 450° C. for 5 hours to obtain a magnetic powder. A magnetic paint was prepared by mixing 5 wt. parts of the resulting magnetic powder with 1 wt. part of an urethane resin and it was coated on a polyester film in a thickness of 2 to 5μ passing through a magnetic field for the orientation of the particles. The coated film was treated by calendering to obtain a magnetic recording tape. The resulting tape is referred to as E-2.

EXAMPLE 3

In accordance with the process of Example 2 except adding 13.5 g. of the aqueous solution of sodium silicate (20% of $SiO_2$) a magnetic recording tape was prepared. The resulting tape is referred to as E-3.

EXAMPLE 4

Into Slurry I obtained in Example 1, 8.6 liter of an aqueous solution containing 2.9 mol of NaOH and 340 g. of $KClO_3$ was added with stirring and 2.7 liter of an aqueous solution containing 2.7 mol of $FeSO_4$ was added with thoroughly stirring and 9 g. of the aqueous solution of sodium silicate (20% of $SiO_2$) was added. The precipitate and the mother liquor were charged into an autoclave and a hydrothermal reaction was carried out at 200° C. for 3 hours under a pressure. In accordance with the process of Example 2, a magnetic recording tape was prepared. The tape is referred to as E-4.

EXAMPLE 5

In accordance with the process of Example 4 except using 1 mol of $FeSO_4$ and 3 g. of the aqueous solution of sodium silicate (20% of $SiO_2$), a magnetic recording tape was prepared. The tape is referred to as E-5.

EXAMPLE 6

In a reactor containing 10 liter of 1 N-NaOH aqueous solution, an aqueous solution containing 3 moles of $FeSO_4$ was charged and the mixture was heated at 50° C. under bubbling air at a rate of 5 liter/min to perform the oxidation for 20 hours to obtain an acicular goethite particles. The slurry containing the resulting goethite is referred to as Slurry II.

In Slurry II, 15 g. of an aqueous solution of sodium silicate (20% of $SiO_2$) was added with stirring. The precipitate together with the mother liquor were charged into an autoclave and a hydrothermal reaction was carried out at 160° C. for 3 hours under a pressure. In accordance with the process of Example 1, a magnetic recording tape was prepared. The resulting tape is referred to as E-6.

REFERENCE 1

In Slurry I obtained in Example 1, 5.4 g. of an aqueous solution of sodium silicate (20% of $SiO_2$) was added with stirring. The precipitate was washed, filtered, dried and ground and reduced in hydrogen gas flow at 400° C. for 5 hours to obtain a magnetic particles. In accordance with the process of Example 1, a magnetic recording medium was prepared. The tape is referred to as C-1.

REFERENCE 2

In accordance with the process of Reference 1 except adding 13.5 g. of the aqueous solution of sodium silicate (20% of $SiO_2$), a magnetic recording tape was prepared. The tape is referred to as C-2.

REFERENCE 3

In Slurry II obtained in Example 6, 6 g. of the aqueous solution of sodium silicate (20% of $SiO_2$) was added with stirring. The precipitate was washed, filtered and dried. In accordance with the process of Reference 1, a magnetic recording tape was prepared. The tape is referred to as C-3.

REFERENCE 4

In accordance with the process of Reference 3, except adding 15 g. of the aqueous solution of sodium silicate (20% of $SiO_2$) with stirring, a magnetic recording tape was prepared. The tape was referred to as C-4.

REFERENCE 5 to 11

In accordance with the processes of the disclosed prior arts, each magnetic particle was produced and each magnetic recording tape was prepared. The sample numbers and the prior arts as patents are shown in Table 1.

TABLE 1

| Sample No. | Prior Art |
| --- | --- |
| C-5 | Japanese Examined Patent Publication No. 19541/1977 (Reference 1) |
| C-6 | Japanese Examined Patent Publication No. 30114/1978 (Reference 7) |
| C-7 | Japanese Unexamined Patent Publication No. 82395/1973 (Example 1) |
| C-8 | Japanese Unexamined Patent Publication No. 72354/1977 (Example 2) |
| C-9 | Japanese Unexamined Patent Publication No. 121799/1977 (Example 41) |
| C-10 | Japanese Unexamined Patent Publication No. 134858/1977 (Example 1) |
| C-11 | Japanese Unexamined Patent Publication No. 10100/1977 (Example 1) |

REFERENCES 12 to 17

The commercially available metallic cassette tapes were tested as References. The sample numbers and the trade names are shown in Table 2.

TABLE 2

| Sample No. | Trade name |
| --- | --- |
| C-12 | Metallic (Sony Co.) |
| C-13 | Super range (Fuji Film Co.) |

TABLE 2-continued

| Sample No. | Trade name |
|---|---|
| C-14 | MX (Hitachi Maxell Co.) |
| C-15 | MX (Hitachi Maxell Co.) |
| C-16 | Metafine (3M) |
| C-17 | metal IX (Basf) |

MEASUREMENTS OF SAMPLES

(i) Measurement of magnetic characteristics

Each of Tapes E-1 to E-6 and C-1 to C-11 was cut in a width of 6 mm and a length of 5 cm (5 cm in the orientation direction). Each sample was holded for 3 times to form a square having a length of about 6 mm and was used for the tests of magnetic characteristics.

Each of Tapes C-12 to C-17 was cut in a length of 9 cm and was holded up for 4 times and was used for the tests of magnetic characteristics.

The vibrating sample type magnetometer (VSM-III manufactured by Toei Kogyo K.K.) was used to measure at room temperature by applying a maximum magnetic field of 5000 Oe.

(ii) Result of measurement

The results of the measurements are shown in Table 3. As described above, the squareness tatio was calculated by a ratio of residual magnetic flux density Br in longitudinal direction of tape to maximum magnetic flux density Bm,(Br/Bm) ∥ and the orientation degree was calculated by (Br/Bm) ∥ to (Br/Bm)⊥ (In Table 3, orientation degree (obs)).

The relations of the squareness ratios and the orientation degrees of References are plotted in FIG. 1. The relations are approximated by method of least squares.

$$\frac{\text{Orientation}}{\text{degree}} = 4.90 \times (\text{squareness ratio}) - 2.07 \ldots 1$$

(correlation coefficient R=0.949)
(The straight line A in FIGS. 1 and 2.)

The orientation degree calculated by the equation 1 from the squareness ratios in Table 3 is referred to as orientation degree (Cal.).

The difference between the orientation degree (Cal.) and the orientation degree (obs) is referred to as Δ orientation degree. In the examples, Δ orientation degrees are more than 0.2. In FIG. 2, the relations of the orientation degrees and the squareness ratios in the examples are shown.

The orientation degree of the magnetic recording tapes of the examples shown in FIG. 2 is shown by the equation:

$$\frac{\text{Orientation}}{\text{degree}} \geq 4.90 \times (\text{squareness}) - 1.87$$

(FIG. 2 straight line C).

(iii) Measurement by Mössbauer effect

Figure 3:
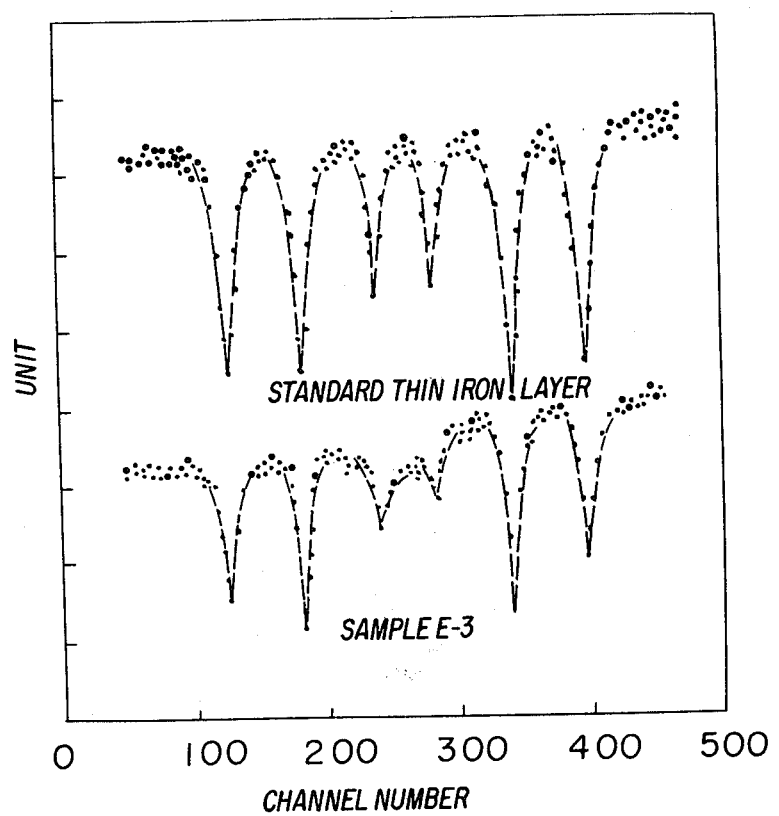
FIG. 3 is a graph of Mössbauer spectra of the magnetic particles of the present invention and the standard metallic iron thin film.

The Mössbauer resonance absorption spectra of the magnetic recording tapes were measured. All of the resonance absorption spectra had 6 absorption lines as shown in FIG. 3 as E-3. These spectra completely correspond to the spectrum of the standard metallic iron thin film. It was confirmed that they contain the metallic iron.

TABLE 3

| Sample No. | Exp. E-2 | Exp. E-3 | Exp. E-4 | Exp. E-5 | Exp. E-6 | Ref. C-1 |
|---|---|---|---|---|---|---|
| Magnetic particles: | | | | | | |
| Hc (Oe) | 1320 | 1350 | 1590 | 1230 | 1570 | 1385 |
| Magnetic recording tape: | | | | | | |
| Hc (Oe) | 1300 | 1288 | 1500 | 1185 | 1480 | 1279 |
| Br (gauss) | 2930 | 2500 | 3300 | 2610 | 3020 | 3010 |
| (Br/Bm)∥ | 0.811 | 0.843 | 0.862 | 0.749 | 0.801 | 0.822 |
| (Br/Bm)⊥ | 0.342 | 0.351 | 0.346 | 0.353 | 0.362 | 0.437 |
| Orientation degree(obs) | 2.37 | 2.40 | 2.49 | 2.12 | 2.21 | 1.88 |
| Orientation degree(Cal.) | 1.90 | 2.06 | 2.15 | 1.60 | 1.85 | 1.96 |
| Δ Orientation degree | 0.47 | 0.34 | 0.34 | 0.52 | 0.36 | −0.08 |

| Sample No. | Ref. C-2 | Ref. C-3 | Ref. C-4 | Ref. C-5 | Ref. C-6 | Ref. C-7 |
|---|---|---|---|---|---|---|
| Magnetic particles: | | | | | | |
| Hc (Oe) | 1402 | 1288 | 1584 | 1212 | 1480 | 1349 |
| Magnetic recording tape: | | | | | | |
| Hc (Oe) | 1235 | 1164 | 1430 | 1050 | 1310 | 1125 |
| Br (gauss) | 2730 | 3030 | 2800 | 2920 | 3410 | 3420 |
| (Br/Bm)∥ | 0.813 | 0.826 | 0.832 | 0.810 | 0.834 | 0.718 |
| (Br/Bm)⊥ | 0.415 | 0.401 | 0.424 | 0.435 | 0.409 | 0.513 |
| Orientation degree(obs) | 1.96 | 20.6 | 1.96 | 1.86 | 2.04 | 1.40 |
| Orientation degree(Cal.) | 1.91 | 1.98 | 2.01 | 1.90 | 2.02 | 1.45 |
| Δ Orientation | 0.05 | 0.08 | −0.05 | −0.04 | 0.02 | −0.05 |

TABLE 3-continued degree

| Sample No. | Ref. C-8 | Ref. C-9 | Ref. C-10 | Ref. C-11 | Ref. C-12 | Ref. C-13 |
|---|---|---|---|---|---|---|
| Magnetic particles: | | | | | | |
| Hc (Oe) | 1250 | 1484 | 1120 | 1415 | — | — |
| Magnetic recording tape: | | | | | | |
| Hc (Oe) | 1018 | 1298 | 1000 | 1260 | 1149 | 1102 |
| Br (gauss) | 3660 | 3170 | 3010 | 3540 | 3300 | 2890 |
| $(Br/Bm)_\parallel$ | 0.771 | 0.746 | 0.788 | 0.763 | 0.789 | 0.778 |
| $(Br/Bm)_\perp$ | 0.451 | 0.481 | 0.461 | 0.451 | 0.407 | 0.450 |
| Orientation degree(obs) | 1.71 | 1.55 | 1.71 | 1.69 | 1.94 | 1.73 |
| Orientation degree(Cal.) | 1.71 | 1.59 | 1.79 | 1.67 | 1.80 | 1.74 |
| Δ Orientation degree | 0.00 | −0.04 | −0.08 | 0.02 | 0.14 | −0.01 |

| Sample No. | Ref. C-14 | Ref. C-15 | Ref. C-16 | Ref. C-17 |
|---|---|---|---|---|
| Magnetic particles: | | | | |
| Hc (Oe) | — | — | — | — |
| Magnetic recording tape: | | | | |
| Hc (Oe) | 1153 | 1158 | 1021 | 1079 |
| Br (gauss) | 2756 | 2970 | 2980 | 2490 |
| $(Br/Bm)_\parallel$ | 0.777 | 0.834 | 0.697 | 0.723 |
| $(Br/Bm)_\perp$ | 0.474 | 0.395 | 0.481 | 0.489 |
| Orientation degree(obs) | 1.64 | 2.11 | 1.45 | 1.48 |
| Orientation degree(Cal.) | 1.74 | 2.02 | 1.35 | 1.47 |
| Δ Orientation degree | −0.10 | 0.09 | 0.10 | 0.01 |

I claim:

1. A magnetic recording tape which has a coercive force of 1000 Oe or more and a residual magnetic flux density of 2000 gauss or more and an orientation degree, which is the ratio of the squareness ratio in the longitudinal direction to the squareness ratio in the transverse direction, of $$\text{Orientation degree} \geq 4.90 \times \frac{\text{squareness ratio}}{\text{in longitudinal direction}} - 1.87$$

comprising: a magnetic metallic iron powder mixed with a binder and coated on a substrate;
wherein said magnetic metallic iron powder is prepared by forming an alkaline aqueous slurry of an acicular hydrated iron oxide or an acicular iron oxide having a pH in the range of 8 to 14, adding a water soluble silicate to said slurry in an amount of 0.1 to 10 mol%, as $SiO_2$ to Fe, treating said slurry by a hydrothermal reaction in a closed reactor at 100° to 250° C. for 5 minutes or longer, dehydrating and drying said slurry to obtain a dry iron oxide containing an $SiO_2$ component, and converting it into a magnetic metallic iron powder by reduction in a hydrogen reducing atmosphere.

2. A process for producing a magnetic recording medium which comprises: forming an alkaline aqueous slurry of an acicular hydrated iron oxide or an acicular iron oxide having a pH in the range of 8–14, adding a water soluble silicate to said slurry in an amount of 0.1 to 10 mol%, as $SiO_2$ to Fe, treating said slurry by a hydrothermal reaction in a closed reactor at 100° to 250° C. for 5 minutes or longer, dehydrating and drying said slurry to obtain a dry iron oxide containing an $SiO_2$ component, converting it into a magnetic metallic iron powder by reduction in a hydrogen reducing atmosphere, mixing said magnetic metallic iron powder with a binder and coating the same on a substrate.

* * * * *